Figure 1:
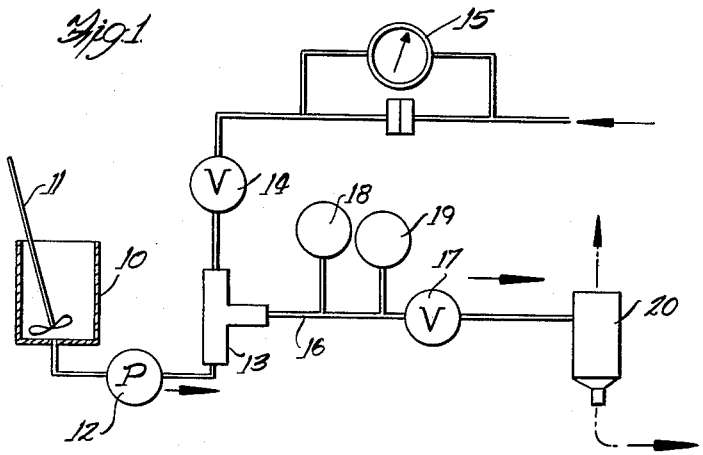

May 19, 1964

V. L. WINFREY ETAL 3,133,836

METHOD OF TREATING STARCH WITH STEAM

Filed March 26, 1962

2 Sheets-Sheet 1

Inventors
William C. Black
Vernon L. Winfrey
Dawson, Tilton,
Fallon, Lungmus & Alexander
Attorneys United States Patent Office 3,133,836
Patented May 19, 1964

3,133,836
METHOD OF TREATING STARCH WITH STEAM
Vernon L. Winfrey and William C. Black, Cedar Rapids, Iowa, assignors to Penick & Ford, Ltd., Cedar Rapids, Iowa, a corporation of Delaware
Filed Mar. 26, 1962, Ser. No. 182,384
5 Claims. (Cl. 127—71)

This invention relates to a method of treating starch with steam. The method can be used in conjunction with a continuous starch cooking procedure, but it can also be applied to pre-cooked starch. This invention also relates to the novel starch products produced by the method.

Starch as it is laid down in plants is in the form of small, dense, hard granules which are relatively insensitive to water and which in the raw state are virtually useless as an adhesive or size. To make starch effective for these uses it is necessary to change its form by heating a water suspension in a process variously known as pasting, gelatinizing, dispersing, hydrating, swelling or cooking. The associative molecular forces which hold the starch molecules together in the original granule become weakened and tend to be replaced by an association of the starch molecules with those of the surrounding water. A lateral swelling of the granules results so that they absorb water and assume a balloon-like form. On continued heating these swollen granules fragment so that a well-cooked starch paste consists of a multitude of hydrated, swollen granule fragments which are effective as an adhesive or sizing material.

Commercially, starch or starch-containing materials are cooked or hydrated by heating their water suspensions, usually by steam, in either batch-type kettles or continuous cookers. In the latter a stream of starch slurry is continuously mixed with steam so that a steady flow of heated, cooked product results. In commercial practice where starch is subjected to continuous pressure cooking at temperatures above 212° F., the quantity of steam mixed with the starch slurry is carefully controlled so as to raise the temperature of the slurry to the predetermined temperature at which the starch is to be cooked by the complete condensation of the steam. The required quantity of steam to accomplish this result can be readily calculated from the published data on the heat content of steam at various pressures, given the input temperature of the slurry, its specific heat, and the temperature to be maintained in the cooker.

In the continuous cooking of starch with steam, as heretofore practiced, the resulting starch has substantially the same properties as starch cooked by other procedures. The main advantage of continuous steam cooking is one of production efficiency. Fully cooked starch can be produced on a continuous basis with very little processing time involved. The design of the cooking or mixing chambers is such as to promote smooth and complete mixing of the steam and slurry so that the steam is rapidly and completely condensed and the temperature of the slurry is almost instantaneously raised to the level desired.

The principal object of the present invention is to modify known methods for treating starch with steam, such as in the continuous cooking of starch, so that the resulting product has unique and improved properties. More specifically, by the method of this invention starch pastes can be produced which exhibit lower viscosities, reduced gelling tendencies, and improved freeze-thaw stability. Further by treating starch by the method of this invention starch pastes can be produced which are particularly adapted to the formation of useful combinations with insolubilizing resins and other chemical reactants. Further objects and advantages will be indicated in the following detailed specification.

In practicing the method of this invention a water slurry of the starch to be treated is passed through a confined zone. The treating zone is maintained at a predetermined superatmospheric pressure and at a predetermined temperature above that of the incoming slurry. Steam is introduced into the zone in intimate contact with the slurry. To achieve the desired results, it is essential that appreciably more steam be introduced than can be condensed as the steam raises the temperature of the slurry to the temperature at which the treating zone is maintained.

The foregoing method is illustrated in the accompanying drawings, wherein—

Figure 2:
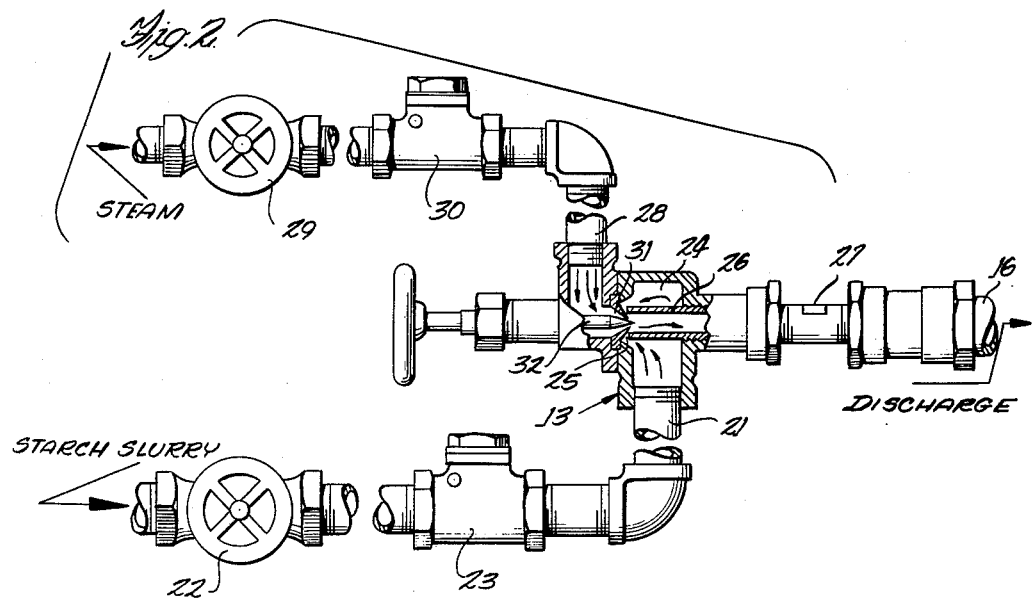
Figure 3:
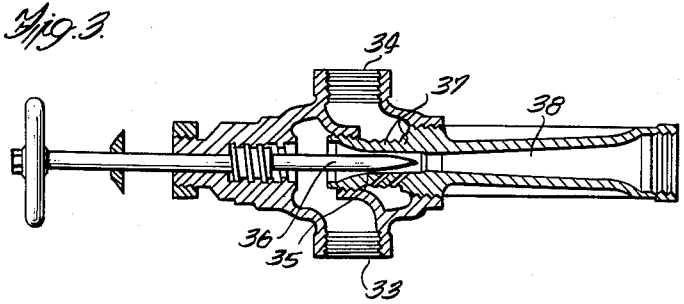

FIG. 1 is a diagrammatic flow sheet illustrating a typical embodiment of the method;

FIG. 2, an enlarged side elevation, partly in section, showing a mixing device or heater which can be incorporated in a continuous cooking system as shown in FIG. 1 for practicing the method of this invention;

FIG. 3, a sectional view of an alternative mixing device or heater; and

Figure 4:
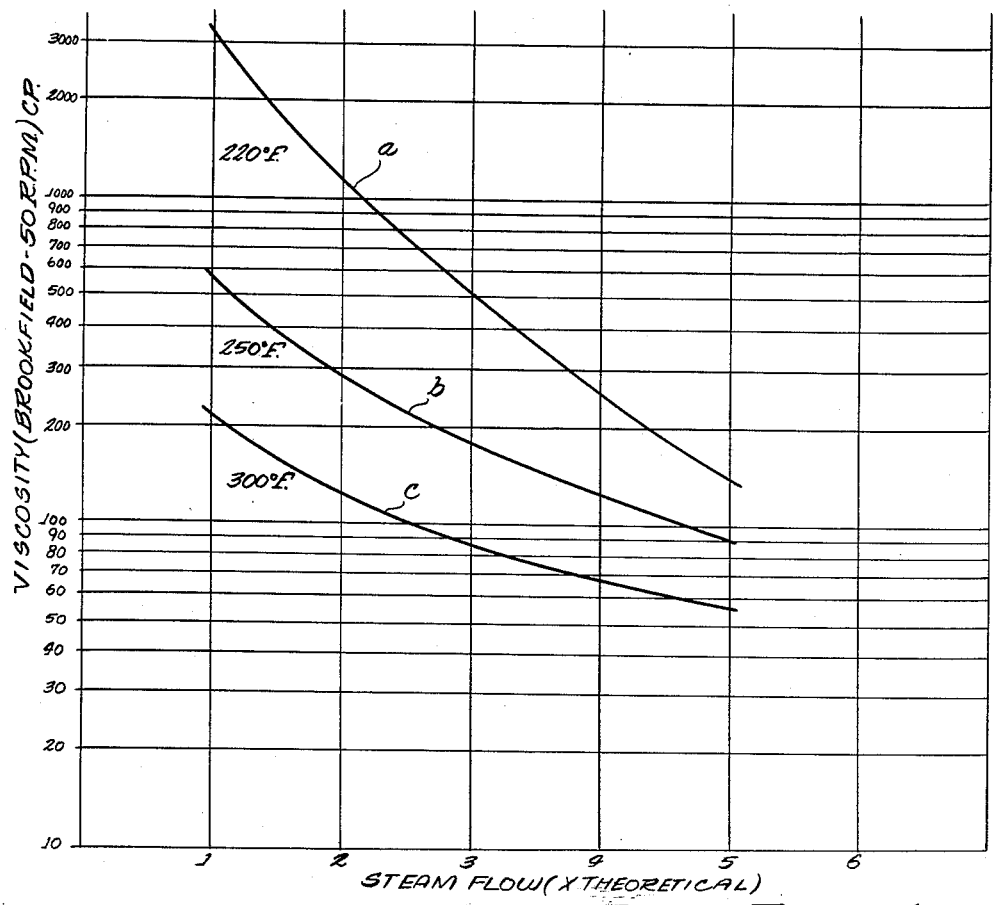

FIG. 4, a chart illustrating the effect of the quantity of steam at various treating temperatures on the viscosity of the starch pastes.

The method of this invention can be practiced in many different types of equipment. For example, FIG. 1 is a diagrammatic illustration of a typical equipment setup. As shown therein, this includes a starch slurry tank 10, which is provided with a mixing means 11. The starch slurry is passed from tank 10 by means of a pump 12 to a steam treating unit or heater 13. Steam is supplied to heater 13 through a valve 14 and a steam flow meter 15. After the steam and slurry are contacted and mixed within the heater 13 they are discharged from the heater through a line 16 which is controlled by a back pressure valve 17. The line 16 is provided with a pressure gauge 18 and a temperature gauge 19. After passing the valve 17 the mixture of slurry and steam is discharged to the atmosphere. In the illustration given the slurry is passed into a flash chamber 20. The excess steam is exhausted through a vent in the top of the flash chamber, and the treated starch slurry or starch paste is discharged from the bottom of chamber 20. Instead of flash chamber 20 an ordinary collecting chamber could be used.

The steam treating unit 13 is shown in greater detail in FIG. 2. As there shown, the starch slurry is supplied through an inlet pipe 21, which is provided with a manual control valve 22 and a back check valve 23. The slurry passes into an annular space 24 and then through a variable orifice 25 into the elongated steam treating chamber provided by pipe 26. The size of orifice 25, and thereby the rate of flow of the slurry into pipe 26 can be varied by rotating the pipe with a wrench at 27. Pipe 26 is connected to the discharge pipe 16 which is controlled by the back pressure valve 17, as previously described. Steam is supplied to the treating zone within pipe 26 through a steam inlet pipe 28, which is equipped with a manual valve 29 and a back check valve 30. The steam from inlet pipe 28 passes through the adjustable orifice 31 of a manually controlled needle valve 32. By adjusting valve 32, the quantity of steam admitted to pipe 26 can be controlled.

FIG. 3 illustrates a steam treating unit which may be substituted for unit 13. With this device, the starch slurry is supplied through an inlet 33, and the steam through an inlet 34. The slurry enters a Venturi passage 35 which is controlled by a manually adjustable needle valve 36. The steam enters the Venturi passage 35 through a plurality of inclined inlet ports 37, and mixes with the slurry in the elongated heating zone 38. It will be understood that heating zone 38 would be connected to pipe 16 with the apparatus set-up of FIG. 1, thereby providing pressure control of the heating zone through a back pressure valve such as valve 17. It will also be understood that the steam supply pipe connected to inlet 34 would be provided with a valve or other means for controlling the rate of steam flow, and that the pipe connected to slurry inlet 33 would also be provided with a valve or other flow control means.

It will be understood that other steam treating devices may be substituted for the units of FIGS. 2 and 3.

In practicing the method of this invention with apparatus like that illustrated in FIGS. 1, 2 and 3, the most important factor is to control the quantity of steam introduced into the treating zone. An appreciable excess of steam is required over that which will be condensed by raising the temperature of the slurry to the temperature being maintained in the treating zone. In other words, an excess of uncondensed steam should be passed through the treating zone together with the starch slurry. The amount of excess or uncondensed steam can vary over a considerable range while still achieving some of the important benefits of this invention. The minimum quantity of steam which can be calculated as being necessary to raise the slurry temperature to the temperature at which the treating zone is maintained can be designated as "theoretical steam." This quantity can be calculated according to the following mathematical relationship:

$$\frac{(\text{Lbs. of slurry per minute}) (T_2 - T_1) (\text{avg. sp. ht. of slurry})}{(\text{Heat content of steam at line pressure} - \text{heat content of condensate at } T_2)} = (\text{lbs. of steam per minute})$$

Where $T_1$ = original slurry temperature
$T_2$ = final paste temperature (also condensate temperature)

In terms of the above formula, at least 25% excess of steam over the theoretical steam is desirable. In other words, the quantity of steam introduced into the treating zone should be at least 1.25 times the amount of steam that will be condensed by raising the temperature of the slurry to the temperature being maintained in the treating zone. In most applications, optimum steam conditions will range from 1.5 to 3 times the amount of steam that is condensed. Usually, it will not be necessary to employ more than 5 times the amount of steam that can be condensed.

One of the effects of employing an excess of steam as described above is shown graphically in FIG. 4. Steam flow in terms of X theoretical is plotted against the viscosity of a 10.5% paste of unmodified corn starch after treatment. Viscosities of the paste were determined at 200° F. with a Brookfield Synchro-Lectric Viscometer at a spindle speed of 50 r.p.m. Three plots are indicated on the graph respectively by liens a, b, and c. Line a shows the effect on viscosity of varying the steam flow where the temperature of the treating zone is maintained at 220° F., line b at 250° F., and line c at 300° F. It will be noted that the curves a, b and c have a similar shape, and that they all exhibit the phenomenon of producing a starch paste of lower viscosity as the steam flow is increased over theoretical. It has been determined that the reduction in viscosity is accompanied by other desirable changes in properties. For example, with excess steam flow, the gelling tendency of the starch paste is reduced, and its freeze-thaw stability is improved. Such alterations of properties are quite useful and significant in many sizing and adhesive applications.

The method of this invention is applicable to any cereal or vegetable starch, such as corn starch, potato starch, tapioca starch, etc. It can be applied to starches which have been modified by previous treatment, such as acid modification, oxidation, derivation, etc. If desired, raw, uncooked starch in the native granule form can be treated according to the method of this invention, thereby resulting in its cooking or gelatinization as well as in the modification of properties previously described. The method, however, is also applicable to pre-cooked starches, that is, the starches which are partially or completely gelatinized. In such cases, the treatment would be primarily for the modification of the properties rather than for the cooking of the starch. It will be understood, of course, that since different kinds and forms of starch vary in gelatinization and flow properties, the method of this invention will not achieve identical results with all starches, or cause their viscosity and other properties to be modified to the same extent. The method can also be used with less refined amylaceous or starch-containing materials, such as flour.

The starch slurry being fed to the steam treating unit may vary considerably in concentration depending on the use to which the heated starch is to be put. For example, laundry starches and some paper sizes, may be processed in the form of slurries having concentrations as low as 3 or 4%. Where the product is to be used as an adhesive or as a component for paper coating formulations, the concentration of the slurry may run as high as 40 to 50%. The slurry may also contain non-starch components, such as pigments, and with such embodiments the total solids content of the slurry may run considerably higher.

For most applications, the slurry will be supplied to the steam treating unit at a temperature of below 170° F. Where the incoming slurry contains raw uncooked starch, the temperature of the slurry will usually not exceed 130° F. As previously indicated, the temperature of the treating zone will be maintained substantially higher than that of the incoming slurry. With a continuous process being operated on a carefully controlled basis, as preferred, a temperature in the treating zone within the range from 225 to 300° F. is preferable. More generally, the temperature of the treating zone should be greater than 212° F. and probably should not exceed 350° F. By pumping the starch slurry through the treating zone at a uniform rate, and controlling the pressure in the treating zone by means of a back pressure valve, the temperature in the treating zone can also be regulated quite closely so that the introduction of a measured quantity of steam will result in a substantially fixed proportion of the steam being condensed while the remainder of the steam passes through the treating zone without being condensed. For example, the slurry feed can be regulated to the desired rate, and the steam flow can be adjusted to a predetermined rate corresponding to the flow rate of the slurry. The back pressure valve can then be gradually closed until the temperature in the cooking zone attains the desired level.

The steam used in the process is preferably saturated steam, as a matter of convenience, but wet or superheated steam can also be used. The normal paper, textile or food mill is equipped with means for producing saturated steam which may contain varying amounts of condensate as it is delivered for use. Such steam is quite satisfactory. If steam is available at elevated pressures and the pressure is reduced prior to feeding the steam to the treating unit, this will mean that the steam as supplied to the treating unit will be superheated. This excess heat must be taken into consideration in calculating the theoretical steam, as specified above. Unless the amount of superheat in the steam is very great, however, the difference between using superheated steam and saturated steam will not be very great, and would not have any marked effect on the operation of the process. In most operating conditions, the pressure maintained in the treating zone will correspond with the pressure of saturated steam at the temperature being used. With respect to the operation of the method, it may be observed that the use of a constant steam flow would be equivalent to different multiples of the "theoretical steam," and depending on the temperature being maintained in the treating zone. Within the ranges specified above, if it is desired to further reduce the viscosity of the treated starch paste or slurry, this can be done by increasing the steam flow while maintaining the same temperature in the treating zone. Using the same quantity of steam at a higher cooking temperature would further reduce the viscosity of the starch paste.

The method of this invention is further illustrated by the following specific examples:

*Example 1*

Using apparatus like that of FIG. 1, a starch slurry was pumped at a continuous fixed rate to the heater 13 where it was contacted and thoroughly mixed with a continuous flow of steam. The steam flow was carefully controlled and metered. The slurry was supplied at a fixed flow rate and by adjustment of the steam control valve 14 and the back-pressure valve 17 the cooking temperature was varied as desired, and at the selected cooking temperature the quantity of steam passing through the unit was also varied.

A series of unmodified corn starch slurries was put through the cooker 13 at a feed rate of 0.3 gal. per minute and of such concentrations that the final paste concentration (including condensate) was 10.5% dry substance. At three different cooking temperatures (220° F., 250° F., and 300° F.) pastes were prepared using several different steam flow rates. Viscosities of the pastes were determined at 200° F., with a Brookfield Syncro-Lectric Viscometer at a spindle speed of 50 r.p.m. FIG. 4 shows the relationship of these viscosities to the amount of steam used at various cooking temperatures. It is apparent that the viscosity of pastes cooked to a given temperature decreases appreciably as the quantity of steam used is increased.

*Example 2*

Samples of starches prepared at 300° F. as in Example 1 and cooked with 1X "theoretical steam" and 2X "theoretical steam" were taken and aged without agitation for 16 hours at 80° F. At the end of that time the sample cooked with 1X "theoretical steam" had gelled or setup sufficiently that difficulty would be experienced in agitating it or pumping it through a pipeline. The sample cooked with 2X "theoretical steam," however, remained fluid and could be readily agitated and pumped even after extended ageing. The reduced gelling tendency of the latter product would permit its use in many instances where the former product would be unsatisfactory. For example, in the warp sizing of textiles, the objectionable formation of "hard size" during periods of non-operation, is minimized or eliminated when the gelling tendency of the size is reduced.

*Example 3*

A considerable amount of starch is cooked and then packaged in glass bottles or aerosol spray-type containers for sale and use as a commercial or domestic laundry starch. As these containers may become partially or completely frozen due to exposure to sub-freezing temperatures during shipment or storage, it is essential that the cooked starch contained therein have good freeze-thaw stability or be capable of being frozen and thawed without significantly changing its properties.

Slurries of a medium viscosity, low substituted hydroxyethyl ether of corn starch were prepared and cooked as follows in a 5% concentration. One sample was cooked in a continuous pressure starch cooker as described in Example 1, at a temperature of 300° F. and using the "theoretical" amount of steam. The other sample was similarly cooked using 2.5X "theoretical steam." Samples of both products were placed in glass jars and frozen solid at a temperature of 15° F. They were then removed from the freezing chamber and allowed to stand in air at 80° F. until thawed. The starch cooked with 1X "theoretical steam" separated badly and on a few hours standing showed a heavy coarse precipitate in the bottom ½ to ⅓ of the jar, while the sample cooked with 2X steam was not significantly changed from the original uniform starch dispension before freezing. The former would be quite unsuitable for use as a laundry sizing material. The latter would be as effective as the original dispersion before freezing.

*Example 4*

Two starch-clay paper coating colors were prepared having 60% commercial solids, 15% starch (Essex Gum 1390—Penick & Ford, Ltd., Inc.) based on clay (H.T. Predispersed—Minerals and Chemicals, Phillipp Corporation), 15% glyoxal (glyoxal 30 Special—Union Carbide Chemicals Company) based on the starch, and 0.2% Quadrofos (Rumford Chemical Co.) based on the clay. The starch mixture was gelatinized in a continuous pressure cooker with enough water to give a paste of 40% solids. This paste was then mixed with a 65% solids clay slip made by suspending the clay and Quadrofos in water. One portion of the starch paste was prepared by cooking to 300° F. with the "theoretical steam," while the other was similarly prepared but with 2X "theoretical steam." Portions of each paste were set aside and aged at room temperature.

After overnight ageing the paste of the starch-glyoxal mixture cooked with "theoretical steam" had achieved a thick, rubbery consistency which made it for all practical purposes unuseable. The mixture cooked with 2X "theoretical steam" remained fluid and useable.

The coating color made with the paste cooked with "theoretical steam" was quite viscous and increased in viscosity still further on aging so that it was not satisfactory for many coating operations. The color made with the paste cooked with 2X "theoretical steam" had a much lower initial viscosity and did not appreciably thicken on ageing, but remained in a useful, fluid condition.

*Example 5*

It is a common practice in the paper industry to modify the surface or strength characteristics of the paper produced by a surface application of starch. The cooked starch size is customarily applied by means of a size press or calender stack. For satisfactory operation, both of these devices require that the size used have a viscosity within a certain range, and to apply the desired added weight of starch solids it is necessary that the size concentration be at a specified level. Unmodified native starches are usually much too viscous for such a use and it becomes necessary to lower their viscosity, as by an acid or an enzyme treatment, to enable them to meet the necessary viscosity-solids requirements of the application procedure. The continuous preparation of starches with more than the theoretical amount of steam, can be advantageously used in some instances for lowering the viscosity of starch paper sizes enough to enable them to meet these viscosity-solids requirements, while at the same time imparting other characteristics which make them desirable for the intended use. This is evidenced by the following experiment in which a 50 lb. eggshell finish book paper was treated in a laboratory size press with 6% solids sizes of cooked starches having comparable viscosities at the application temperature of 140° F.

Size *a* was an unmodified corn starch continuously cooked at 300° F. with 3X theoretical steam and having a final Dudley viscosity at 140° F. of 46 seconds Dudley (water=34 sec.).

Size *b* was a 30 fluidity thin-boiling (acid modified) starch conventionally cooked on a steam bath to 195° F. for 15 minutes. It had a Dudley viscosity of 49 seconds at 140° F.

The sized sheets were tested as follows:

|  | (a) | (b) | (Unsized) |
|---|---|---|---|
| Mullen | 18.3 | 13.0 | 8.4 |
| Wax pick (Dennison) | 18+ | 13.5 | 9.0 |

While in the foregoing specification this invention has been described in relation to certain preferred embodiments thereof and many details have been set forth for purpose of illustration, it will be apparent to those skilled in the art that the invention is susceptible to other embodiments and that certain of the details described herein can be varied considerably without departing from the basic principles of the invention.

We claim:

1. The method of steam cooking starch, comprising continuously passing a water slurry of the starch to be cooked through a cooking zone, maintaining said zone at a predetermined pressure and at a predetermined temperature, said temperature being above 212° F. and above that of the incoming starch slurry, and introducing into said zone in intimate contact with said slurry from 1.25 to 5 times the amount of steam that is condensed as said steam raises the temperature of said slurry to said predetermined temperature at said predetermined pressure, whereby said starch slurry passes through said cooking zone together with an excess of uncondensed steam.

2. The method of steam cooking starch, comprising continuously pumping a water slurry of the starch to be cooked through a cooking zone, maintaining said zone at a predetermined superatmospheric pressure and at a predetermined temperature above that of the incoming starch slurry, said temperature being above 212° F. but not over 350° F., and introducing into said zone in intimate contact with said slurry from 1.5 to 3 times the amount of steam that is condensed as said steam raises the temperature of said slurry to said predetermined temperature at said predetermined pressure, whereby said starch slurry passes through said cooking zone together with an excess of uncondensed steam.

3. The method of steam cooking starch, comprising continuously passing a water slurry of the starch to be cooked through a cooking zone, maintaining said zone at a predetermined superatmospheric pressure and at a predetermined temperature above that of the incoming starch slurry, said temperature being about 212° F. but not over 350° F., introducing into said zone in intimate contact with said slurry from 1.25 to 5 times the amount of steam that is condensed as said steam raises the temperature of said slurry to said predetermined temperature at said predetermined pressure, and discharging the slurry from said zone together with the excess uncondensed steam to another zone maintained at a substantially lower pressure, thereby obtaining a starch paste of novel properties.

4. The method of steam cooking starch, comprising continuously pumping a water slurry of the starch to be cooked through a cooking zone, maintaining said zone at a predetermined superatmospheric pressure and at a predetermined temperature above that of the incoming starch slurry, said temperature being within the range from 225° F. to 300° F., introducing into said zone in intimate contact with said slurry from 1.5 to 3 times the amount of steam that is condensed as said steam raises the temperature of said slurry to said predetermined temperature at said predetermined pressure, and discharging the slurry from said zone together with the excess uncondensed steam to another zone maintained at substantially atmospheric pressure.

5. The method of steam cooking starch, comprising continuously passing a water slurry of the starch to be cooked through a confined cooking zone, maintaining said zone at a predetermined superatmospheric pressure and at a predetermined temperature above that of the incoming starch slurry, said temperature being within the range from 225 to 300° F., said pressure being at least as great as that of saturated steam at said predetermined temperature, introducing into said zone in intimate contact with said slurry from 1.5 to 3 times the amount of substantially saturated steam that is condensed as said steam raises the temperature of said slurry to said predetermined temperature at said predetermined pressure, and discharging the slurry from said zone together with the excess uncondensed steam to a zone maintained at a substantially lower pressure.

References Cited in the file of this patent

UNITED STATES PATENTS

| 2,633,436 | Martin | Mar. 31, 1953 |
| 2,678,276 | North | May 11, 1954 |
| 2,730,468 | Martin | Jan. 10, 1956 |